United States Patent [19]

Hawiuk

[11] Patent Number: 5,779,479
[45] Date of Patent: Jul. 14, 1998

[54] METHOD OF DETERMINING THE OUTCOME OF COLORING A PERSON'S HAIR

[76] Inventor: Andrea S. Hawiuk, 102-35 Bennet St., Red Deer, Canada, T4R 1V3

[21] Appl. No.: 812,911

[22] Filed: Mar. 10, 1997

Related U.S. Application Data

[62] Division of Ser. No. 360,634, Dec. 21, 1994, Pat. No. 5,609,484.

[51] Int. Cl.⁶ .................................................. G09B 9/10
[52] U.S. Cl. .................... 434/94; 434/99; 434/100; 434/103; 132/208
[58] Field of Search .................. 434/98, 94, 99, 434/100; 132/208, 202

[56] References Cited

U.S. PATENT DOCUMENTS

| D. 276,661 | 12/1984 | Cafazzo . |
| 1,629,330 | 5/1927 | Adler . |
| 1,657,413 | 1/1928 | Schumer . |
| 2,221,774 | 11/1940 | Bowser . |
| 3,609,886 | 10/1971 | Vien . |
| 3,702,508 | 11/1972 | Netter . |
| 4,224,745 | 9/1980 | Hubbard . |
| 4,258,478 | 3/1981 | Scott et al. . |
| 4,583,562 | 4/1986 | Stewart . |
| 4,761,137 | 8/1988 | Taylor et al. . |
| 5,209,664 | 5/1993 | Wilcox . |
| 5,316,481 | 5/1994 | Louise et al. ............... 434/99 |

FOREIGN PATENT DOCUMENTS

| 868475 | 4/1971 | Canada ................... 434/94 |
| 2249600 | 5/1975 | France ................... 434/94 |
| 2429462 | 2/1980 | France . |
| 7413252 | 5/1976 | Netherlands ............. 434/94 |

*Primary Examiner*—Jeffrey A. Smith
*Attorney, Agent, or Firm*—Oyen Wiggs Green & Mutala

[57] ABSTRACT

Method and apparatus for illustrating and teaching hair coloring techniques. More particularly, this invention relates to a unique method and apparatus for educating a person on hair coloring procedures, and determining in advance appropriate proportions of hair coloring to be added to the basic hair color of a person in order to achieve a desired color effect on the basic hair color. An apparatus comprising a holder for releasably holding one or more colored filament swatches; a swatch comprising a group of elongated colored filaments, held together in parallel relationship with another, and secured together at one end by a filament base.

5 Claims, 6 Drawing Sheets

METHOD OF DETERMINING THE OUTCOME OF COLORING A PERSON'S HAIR

REFERENCE TO RELATED APPLICATION

This is a division of U.S. patent application No. 08/360,634 filed 21 Dec., 1994 entitled METHOD AND APPARATUS FOR ILLUSTRATING AND DETERMINING QUANTITY OF HAIR PIGMENT CONCENTRATE TO ACHIEVE DESIRED HAIR COLOUR (now U.S. Pat. No. 5,609,484).

FIELD OF THE INVENTION

This invention relates to a novel method and apparatus for illustrating and teaching hair colouring techniques. More particularly, this invention relates to a unique method and apparatus for educating a person on hair colouring procedures, and determining in advance appropriate proportions of hair colouring to be added to the basic hair colour of a person in order to achieve a desired colour effect on the basic hair colour.

BACKGROUND OF THE INVENTION

It is very difficult for hairdressers, and also their customers, to visualize precisely the final result on a customer's hair when a certain hair colour, tint or pigment is applied to the customer's hair. In many cases, because of the wide variety of basic hair colours, ranging from black to blonde, and individual characteristics of various customers, it is not possible to accurately predict the outcome, when a particular hair colour is applied to the particular customer's hair. The end result is often something which the customer is not satisfied with. In many cases, the customer refuses to pay the hairdresser for the hair colouring job or the colouring has to be redone, at no charge, to the customer's satisfaction.

A number of patents have been granted over the years relating to hair colouring techniques and colour mixing.

| U.S. Pat. No. | Inventor | Issue Date |
| --- | --- | --- |
| 1,629,330 | Adler | May 17, 1927 |
| 1,657,413 | Schumer | January 24, 1928 |
| 2,221,774 | Bowser | November 19, 1940 |
| 3,609,886 | Vien | October 5, 1971 |
| 3,702,508 | Netter | November 14, 1972 |
| 4,224,745 | Hubbard | September 30, 1980 |
| 4,258,478 | Scott | March 31, 1981 |
| 4,583,562 | Stewart | April 22, 1986 |
| 4,761,137 | Taylor | August 2, 1988 |
| 5,209,664 | Wilcox | May 11, 1993 |

Six of the foregoing merit specific comment. Vien discloses a method of choosing commercial hair colouring dyes. Vien demonstrates a folder displaying coloured samples of dyed hair. Each page within the folder features a base hair colour and teaches the results the customer can achieve by applying a particular tint from a commercial line of hair colouring products.

Netter discloses a device for displaying sample locks of dyed hair. This device allows the customer selecting a hair dye to see the shade which will result from using a particular tint from a commercial line of dyes.

Taylor discloses a method of visually examining the colour which will result from mixing combinations of commercial dyes before the mixture is applied to the customer's hair. The device allows the operator to rotate transparent colour cones one over top of another to show the resulting tint.

Hubbard discloses a teaching aid which uses heat to simulate the results that can be expected when chemical permanent wave solutions and commercial dyes are applied to the human scalp.

Scott discloses an apparatus which allows the customer to visually preview the results of hair styling and colouring. The apparatus uses a slide projector to project images of realistic colour and or hair styles, in combination with an image of the customer's face, onto a viewing screen.

Wilcox discloses an artist's palette which teaches colour mixing techniques.

SUMMARY OF THE INVENTION

The invention is directed to an apparatus comprising a holder for releasably holding one or more coloured filament swatches with one end of each of the swatches held together. The invention is also directed to a swatch comprised of a group of elongated coloured filaments which are held together in parallel relationship with another. The filaments of the swatches are secured together at one end by a filament base, such as a plastic clip or a holder.

The holder for one or more swatches should be of a type which enables swatches of filaments to be grouped together with the narrow base ends aligned, and removably secured within the holder. The free filament ends should extend from the holder and be able to be brushed together to give a combined filament effect.

The invention is also directed to an apparatus comprising: (a) a holder for releasably holding one or more coloured filament swatches; (b) one or more swatches, each comprising a group of elongated coloured filaments, held together in parallel relationship with another, and secured together at one end by a filament base, the holder holding the swatches at the base end.

The holder can comprise: (a) a base member; and (b) a hinge member hingedly secured to the base member, the hinge member and the base member holding the one or more coloured filament swatches between them. The base member can have a mounting member thereon for holding the filament bases of the filament swatches. The base member and the hinge member, when the hinge member and the base member are closed against one another, can be held by a locking member.

The base member can have a first filament press plate mounted thereon, and the hinge member can have a second filament press plate mounted thereon, said first filament press plate and said second filament press plate facing one another when the hinge member and the base member are closed together, and the filaments of the filament swatch can pass between the first filament press plate and the second filament press plate.

The holder alternatively can be a scissor-action spring-loaded holder. The holder can in another form be in the shape of a ring, and the bases of the coloured filament swatches can have releasable fasteners therein which enable the bases to be detachably attached to the ring holder.

The invention also comprises a hair colouring demonstration kit comprising: (a) a swatch having a group of parallel disposed black filaments; (b) three swatches having a group of parallel disposed brown filaments; (c) three swatches having a group of parallel disposed blonde filaments; (d) three swatches having a group of parallel disposed red auburn filaments; (e) three swatches having a group of parallel disposed grey filaments; (f) a swatch having a group of parallel disposed white filaments; (g) a swatch having a group of parallel disposed brilliant red filaments; (h) a swatch having a group of parallel disposed violet filaments; (i) a swatch having a group of parallel disposed gold filaments; and (j) a swatch having a group of parallel disposed blue filaments.

The invention also comprises a hair colouring demonstration kit comprising: (a) a swatch having at least one group of parallel disposed black filaments of at least one foot in length; (b) at least three swatches having a group of parallel disposed brown filaments of at least one foot in length; (c) at least three swatches having a group of parallel disposed blonde filaments of at least one foot in length; (d) at least three swatches having a group of parallel disposed red auburn filaments of at least one foot in length; (e) at least three swatches having a group of parallel disposed grey filaments of at least one foot in length; (f) at least one swatch having a group of parallel disposed white filaments of at least one foot in length; (g) at least one swatch having a group of parallel disposed brilliant red filaments of at least one foot in length; (h) at least one swatch having a group of parallel disposed violet filaments of at least one foot in length; (i) at least one swatch having a group of parallel disposed gold filaments of at least one foot in length; and (j) at least one swatch having a group of parallel disposed blue filaments of at least one foot in length.

The invention is also directed to a method of determining the outcome of colouring a person's hair comprising: (a) blending together a group of coloured filaments to match the basic hair colour of the customer; (b) blending together one or more groups of coloured filaments corresponding to the degree of colour accent to be added to the basic hair colour of the person; (c) blending together the basic hair colour matching filaments (a) with the colour accent filaments (b) to achieve a blended colour combination for visualization by the person.

The weight of coloured filaments (b) is directly proportional to the volume of hair colouring accent to be added to the hair of the person. Hair colouring is proportional to the weight of the colour accented filaments (b) and is mixed together, and applied to the hair of the person.

A first group of coloured filaments is blended with a second group of coloured filaments of a second colour, in order to achieve a blended mixed combination of the first and second colours, and the blended first and second coloured filaments can then be blended with the basic hair colour matching filaments (a).

The mixture of coloured filaments can be selected from a group of coloured filaments comprising: (a) a swatch having a group of parallel disposed black filaments of at least one foot in length; (b) three swatches having a group of parallel disposed brown filaments of at least one foot in length; (c) three swatches having a group of parallel disposed blonde filaments of at least one foot in length; (d) three swatches having a group of parallel disposed red auburn filaments of at least one foot in length; (e) three swatches having a group of parallel disposed grey filaments of at least one foot in length; (f) a swatch having a group of parallel disposed white filaments of at least one foot in length; (g) a swatch having a group of parallel disposed brilliant red filaments of at least one foot in length; (h) a swatch having a group of parallel disposed violet filaments of at least one foot in length; (i) a swatch having a group of parallel disposed gold filaments of at least one foot in length; (j) a swatch having a group of parallel disposed blue filaments of at least one foot in length.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
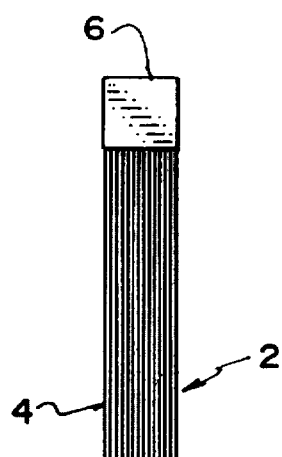
FIG. 1 illustrates a front view of a colour filament swatch with one end in a filament base.

The inventor has developed a system whereby selected colour filament swatches, each showing various specific shades of colour, can be blended together to simulate the colour of a customer's basic hair. Then, in order to achieve the coloured hair effect desired by the customer, further colour filament swatches of various colours corresponding in weight with unit weights of commercial hair tints are added, or blended together, to arrive at a colour blend which represents a net combination of the base colour of the customer's hair, and the effect of the added colour pigment to thereby create the visual colour desired by the customer.

In the case of the customer wanting to have his or her hair coloured, the object of the invention is to first blend selected colour filament swatches taken from the full array or spectrum of stock colour filament swatches so that as a blended group they closely match the customer's basic hair colour. Then, proportional blends by weight of colour filament swatches of different colours corresponding to units of liquid hair colouring agents are blended with the original blended base hair colour swatch set in order to arrive at a combined hair colour effect which is required by the customer. The combination is shown to the customer for approval before the actual hair colouring agent is applied to the hair. It may seem surprising, but basic swatches of yellow, red, purple, blue or grey from colour filament swatches can be added to base blends of swatches in order to create a blended hair colour desired by the customer. For instance, a colour swatch of green filaments can be used to neutralize red hair tints in the hair of the customer, thereby yielding a blended hair colour which is described in the hair trade as "ash blonde".

The inventor has designed an apparatus and system whereby lengths of coloured synthetic fibre, representing hair, are used in swatch form to visually teach the techniques of hair colouring to students at a hair dressing school. The coloured filament swatches can also be used to visually demonstrate to a hair salon customer the actual colour that the customer's hair will be when treated with a particular single tint or hair colouring agent or a blend of commercial hair colouring tints or pigments. The apparatus and method of the invention allows the stylist to accurately determine the proportions of coloured tints or agents required to achieve a particular tinted hair colour result.

In one embodiment, the basic hair colouring teaching and demonstration kit can comprise:

(1) A six shade colour spectrum made from synthetic coloured filaments approximately 18–30 inches in length, one ounce in weight, or equivalent, securely attached at one end, representing the basic colour wheel of three primary colours (red, yellow and blue) and three secondary colours (orange, green and violet). The one ounce in weight can be comprised of proportions, for example, sixteenths, eighths, quarters, halves, and the like, in weight, to add up to a total of one ounce in weight.

(2) A second client colour spectrum comprising twenty-two swatches by weight of synthetic coloured filaments:

1 black swatch
3 brown swatches
3 blonde swatches
3 red swatches
3 grey swatches
1 white swatch
1 brilliant red swatch
2 violet swatches
1 gold swatch
2 blue swatches
2 green swatches It will be understood that other swatch groups can be used, adding or deleting certain swatch colours. Also, shades of colours of swatches can be included, for example, dark and light blue, dark and light green, and the like.

(3) A colour display wheel representing one ounce of liquid commercial dye, pigment or tint:
  (a) the wheel being divided into equal sections corresponding with the number of colours;
  (b) each section representing a calculation on one ounce of liquid dye;
  (c) each section comprising a proportionate number of strands of coloured filaments.

Therefore, one ounce of liquid colour is represented by a proportionate weight and colour combination so that the total adds up to one ounce of coloured filament strands.

(4) A holder into which the coloured filament swatches are stacked, or grouped, allowing the filaments to hang vertically and permit the stylist, or student, to brush the filaments of the various coloured swatches together to see the end results of blending the coloured filaments together.

In another embodiment, the method of the invention comprises teaching hair colouring technique to a student comprising the following steps:

(1) Using a primary and secondary colour display, and an appropriate sunlight simulating lamp, students can be shown how to mix colours and what proportions of colours are required to achieve a specific result;

(2) Using proportional swatches of coloured filaments corresponding to proportionate weights of commercial dyes, the student can be taught what proportions and quantities of liquid dye, tint or pigment must be mixed to achieve a specific blended colour.

In a further embodiment, the method of the invention involves colour consultation which comprises the following steps:

(1) Using the swatch colour display or board, swatches of specific colours are mixed together to achieve a blended swatch colour which matches the client's basic or current hair colour;

(2) Using the swatch colour display, various swatches of specific colour are blended through trial and error, or experience, with the customer's basic or current hair colour swatch of step (1) until a new colour, suitable to the customer's requirement is arrived at;

(3) The appropriate proportions and quantities by weight of liquid commercial colour determined from the number of colour swatches of step (2) above, which correspond in weight, are mixed and applied to the customer's hair to achieve the desired hair colour effect.

Finally, in a further embodiment, the invention includes a video which shows a basic demonstration about colour mixing and secondly how the system of the invention can be used to:

(1) actually duplicate with swatches the base colour of the customer's hair;

(2) demonstrate to the client with swatches what the addition of the colour, dye, pigment or tint she or he has picked would look like on her or his basic hair colour;

(3) determine the weight of the proportions and quantities of hair colour dye or tint typically in ounce measurements the stylist must use to achieve the colour the client has chosen.

This demonstration system according to the invention eliminates the possibility of the customer being dissatisfied with the end results of his or her new colour because he or she has already seen the results before his or her own hair is done.

Referring to the drawings, FIG. 1 illustrates a front view of a basic colour filament swatch. As seen in FIG. 1, a basic colour filament swatch 2 is constructed of a group of parallel coloured filaments 4, of the same colour, held together at one end by a filament base 6. The other end of the filaments is free and can be brushed. The weight of coloured filaments in a swatch 2 can be adjusted to correspond with $\frac{1}{16}$ ounce, $\frac{1}{8}$ ounce, $\frac{1}{4}$ ounce, $\frac{1}{2}$ ounce and one ounce of hair colouring, tint or dye, as alleged to previously. The group of filaments 4 making up a basic swatch 2 are of uniform colour.

Figure 2:
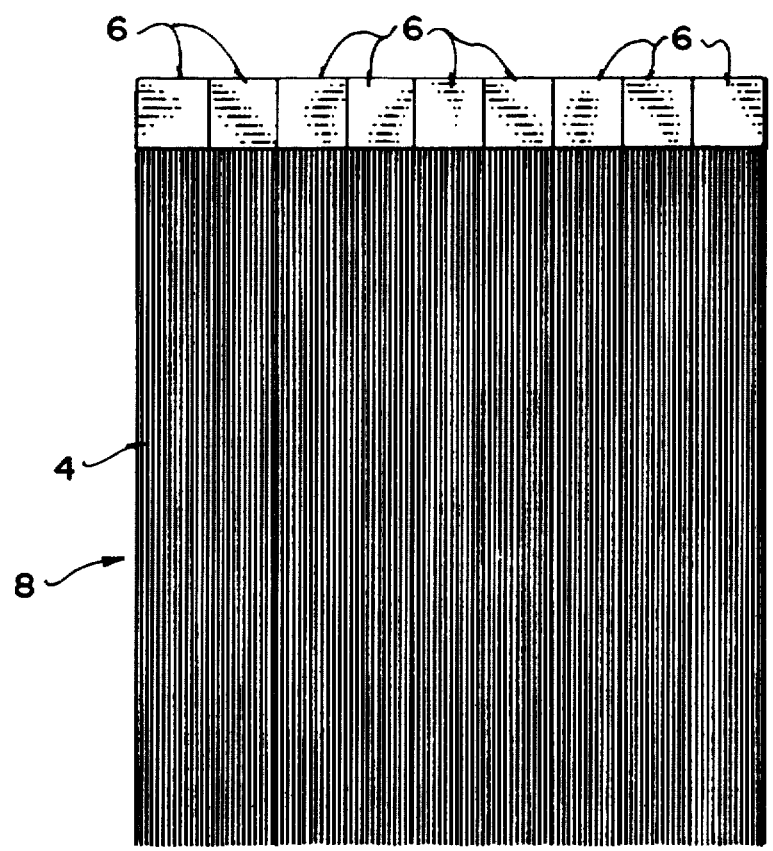
FIG. 2 illustrates a front view of a series of filament swatches of different colours arranged side-by-side.

FIG. 2 illustrates a front view of a series of filament swatches 4 of different colours arranged side-by-side in a row. Alternatively, the series of filament swatches can be laid out in a row, or in other attractive patterns, or assembled with the filament bases 6 held together. The important criterion is that the filaments of the swatches are arranged flat or otherwise so that the free ends of the filaments can be brushed together to provide a blended effect.

As seen in FIG. 2, an array of colour filament swatches 8 are disposed side-by-side to make up a standard group of swatches, which together comprise a filament swatch kit. This kit can be used by any hair colourist trained to use the subject invention. In one version, as a general package, or kit, the array of swatches 8 comprise one swatch of black filaments, three swatches of brown filaments, three swatches of blonde filaments, three swatches of red auburn filaments, three swatches of grey filaments, one swatch of white filaments, one swatch of brilliant red filaments, one swatch of violet filaments, one swatch of gold filaments, and one swatch of blue filaments. The manufacturer can add other colours of swatches as desired.

It will be understood that swatches having coloured filaments different from those listed previously can be used. It will also be understood that the weight of swatches mentioned previously can be varied, for instance, there can be two swatches of black filaments, four swatches of brown filaments, six swatches of blonde filaments, and the like. Furthermore, filaments of colours other than those mentioned previously, can be used. The weight of filaments in each swatch can also be varied.

Figure 3:
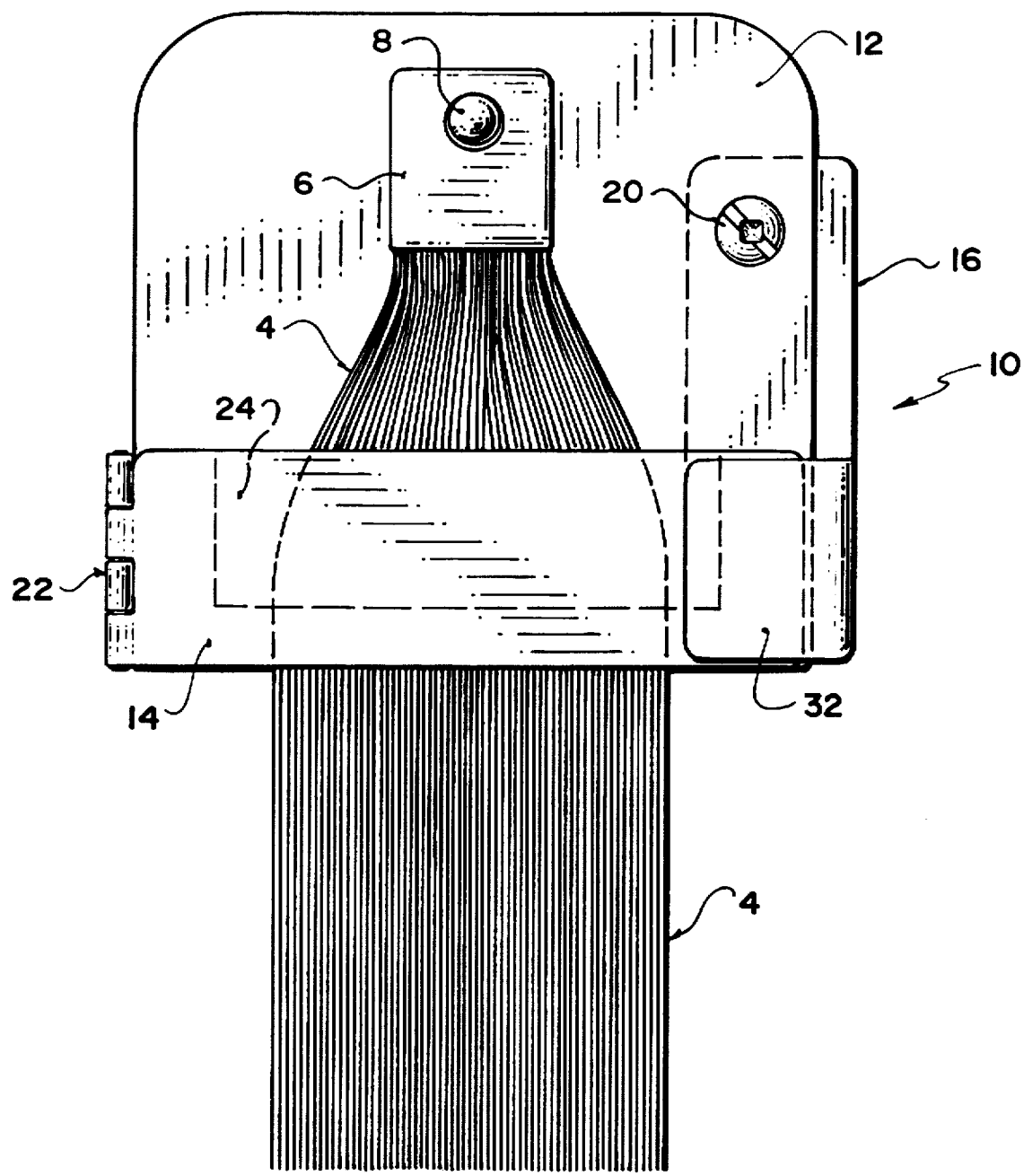
FIG. 3 illustrates a front view of colour filament swatches held in a holder.

FIG. 3 illustrates a front view of colour filament swatches held in a swatch holder. Specifically, as illustrated in FIG. 3, the swatch holder 10 is constructed of a base plate 12, a hinge plate 14 which is hingedly secured to one base side of the base plate 12 by a hinge 22, a removable lock plate 16, which can be removably secured to the base plate 12 by means of a screw bolt 20, to the side of the base plate 12 opposite the hinge 22, and a swatch post 18 protruding from the upper front face of the base plate 12. Positioned behind the face of the hinge plate 14 is a first filament press plate 24, shown in dotted lines.

When the hinge plate 14 is closed, and held securely by the lock plate 16, the filament bases 6, held on swatch post 18, and the colour filaments 4, which extend downwardly from the base 6, are held securely and pressed in a spread-out flat orientation, so that the filaments 4, which extend below the hinge plate 14, can be readily brushed together to provide the desired blended effect achieved by intermingling the various filaments 4 of the selected series of swatches held in the holder 10.

Figure 4:
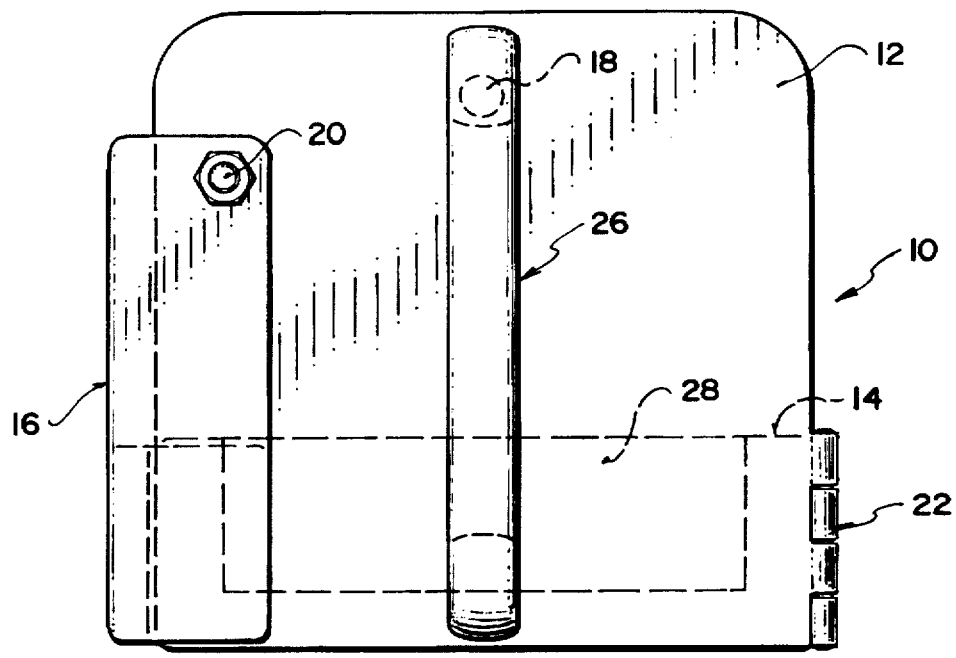
FIG. 4 illustrates a rear view of a swatch holder.

FIG. 4 illustrates a rear view of the swatch holder 10. As seen in FIG. 4, the base plate 12 has a vertical handle 26 mounted on the rear side thereof. A second filament press plate 28, shown in dotted lines, lies immediately behind the base plate 12. The lock plate 16 is shown secured over the left of the base plate 12 and the hinge plate, which is not visible in FIG. 4.

Figure 5:
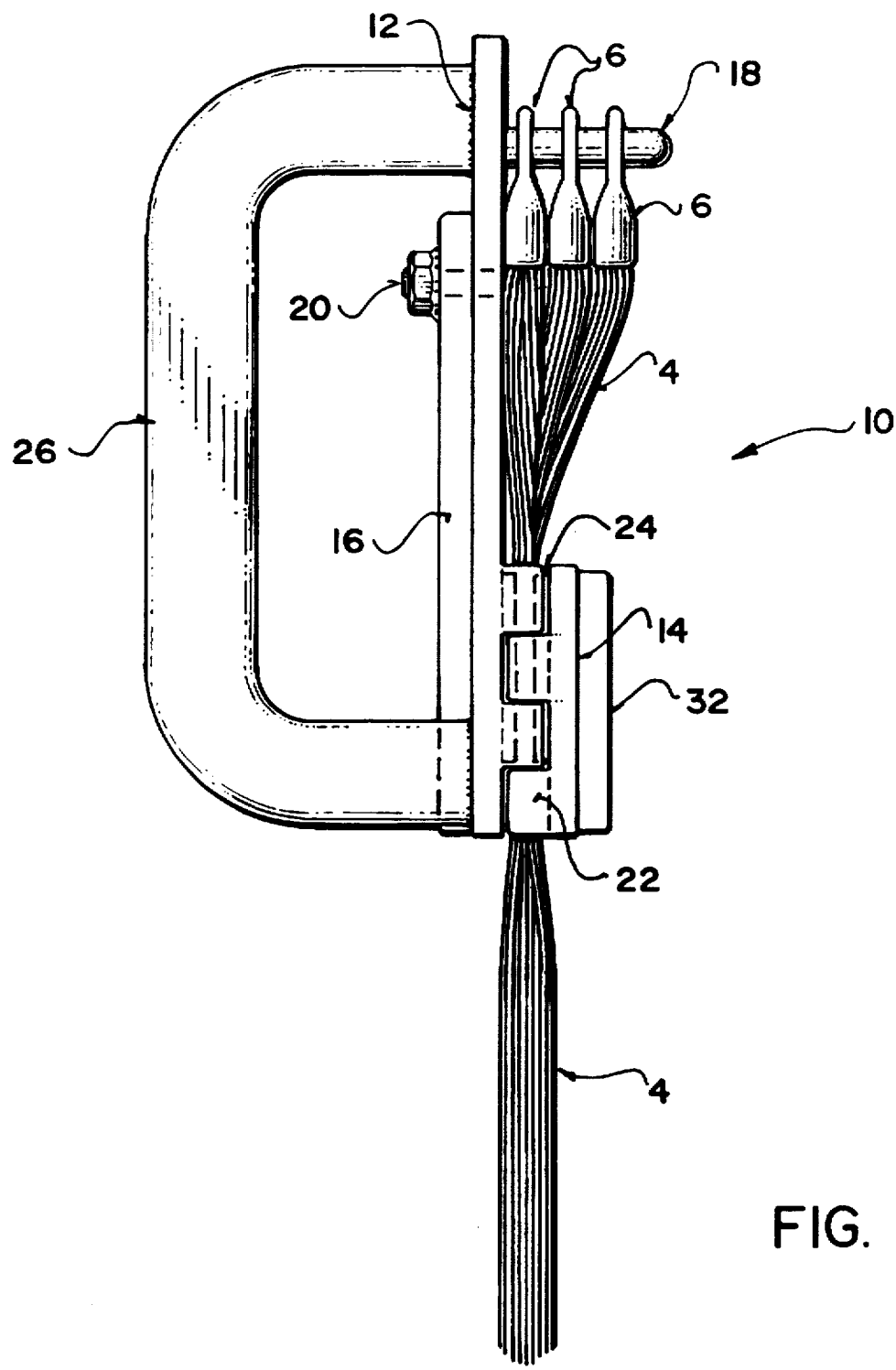
FIG. 5 illustrates a side view of a swatch holder, with three filament swatches.

FIG. 5 illustrates a side view of a swatch holder, with three filament swatches held in place by the holder. As seen in FIG. 5, the handle 26 extends to the left of the base plate 12. The swatch post 18 projects horizontally from the upper region to the right of the base plate 12. The hinge plate 14, with the underlying first filament press plate 24, is clamped against base plate 12 and second filament press plate 28 (not visible in FIG. 5) by lock plate 16, held by screw bolt 20. FIG. 5 shows how, in this case, three filament bases 6, with corresponding sets of filaments 4, are mounted over swatch post 18. The three groups of filaments 4 are suspended downwardly and pressed securely by hinge plate 14, and the corresponding first filament press plate 24 and the second filament press plate 28, to thereby flatten and spread out the filaments 4. The free ends of the filament 4 that extend downwardly from the base of the holder 10 are free to be brushed so that the filaments intermingle and create the desired filament blended effect.

Figure 6:
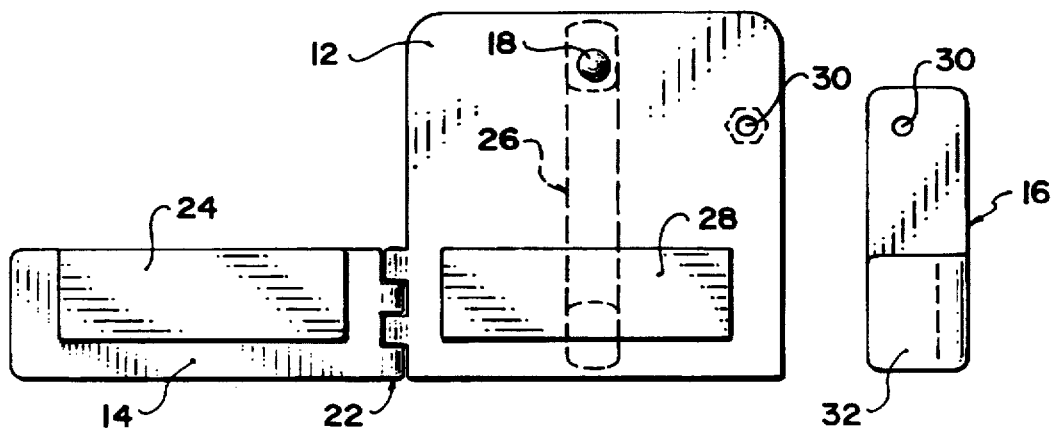
FIG. 6, which appears on the same sheet as FIG. 4, illustrates a front view of a swatch holder in open position, with the lock plate to one side.

FIG. 6 illustrates a front view of a swatch holder in open position, with the lock plate 16 off to the right side. As seen in FIG. 6, the hinge plate 14 has been swung to a position where it extends to the left side of the base plate 12. As shown in FIG. 6, the first filament press plate 24, which is secured to the hinge plate 14, and the second filament press plate 28, which is secured to the base plate 12, are clearly shown. When the hinge 14 is swung about hinge 22 to a closed position against base plate 12, first filament press plate 24 abuts second filament press plate 28, and thereby flattens the filaments that pass between the two press plates 24 and 28.

FIG. 6 also shows in dotted lines the rear handle 26. FIG. 6 also shows bolt holes 30, which are drilled in the base plate 12 and the lock plate 16, to accommodate screw bolt 20, shown previously in FIGS. 3, 4 and 5.

The lock plate 16 is constructed so that it has a clamp 32, with a space between the clamp 32 and the base of the lock plate 16, so that the clamp 16 can be fitted over the hinge plate 14 and the base of the base plate 12, when the hinge plate 14 is closed against the base plate 12. The screw bolt 20 is then inserted through the aligned holes 30 in the base plate 12 and 30 and the lock plate 16.

Figure 7:
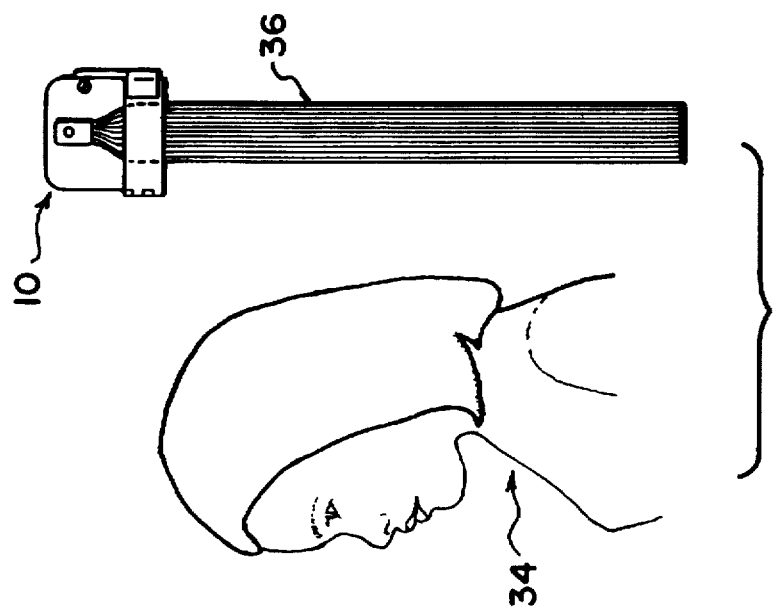
FIG. 7 illustrates a side view of a hair colouring customer and a group of colour filament swatches held in a swatch holder and blended to match the base hair colour of the customer.

FIG. 7 illustrates a side view of a hair colouring customer 34 and a group of coloured filament swatches 36 blended to match the base hair colour of the customer 34 who would have a typical hair colour, for example, brunette. As part of the method of the invention, the hair colourist (not shown) would select and test an appropriate combination of filament swatches 36 which, when brushed together, would achieve a blended effect, i.e. brunette. The group of such filament swatches 36 are shown held in holder 10. With experience, and training, the hair colourist would be able to select the proper numbers and colours of individual swatches and group them together in a group 36, in order to achieve a match of the hair colour of the customer 34. For instance, if the customer 34 has brunette hair, the hair colourist, in order to match the brunette hair colour of the customer 34, may select one black swatch, two brown swatches, and two blonde swatches, which when brushed together would yield a brunette colour which matched the base hair colour of the customer 34. The blended swatch group 36 can then be held against or placed on the head of the customer 34 in order to compare side-by-side the base hair colour of the customer 34 and the blended colour of the blended colour swatch group 34.

The next step according to the invention is to then discuss with the customer 34 the type of hair colouring that is to be added to the basic hair colour of the customer 34, in order to achieve the customer's desired hair colour effect. For instance, the customer 34 may wish to add a red auburn tint to her hair. In that case, the hair colourist would place one or more swatches of red auburn colour filaments together to make a filament swatch group 38. The number of red auburn swatches making up the group 38 would correspond to ounces or fractions of ounces of red auburn hair colouring that should be added to the hair of the customer 34 in order to achieve the desired red auburn highlighted effect.

It will be understood that swatches may be subtracted or removed to achieve other desired hair colouring effects. In other words, it is not always necessary to add colour filaments to achieve a desired blend.

Figure 8:
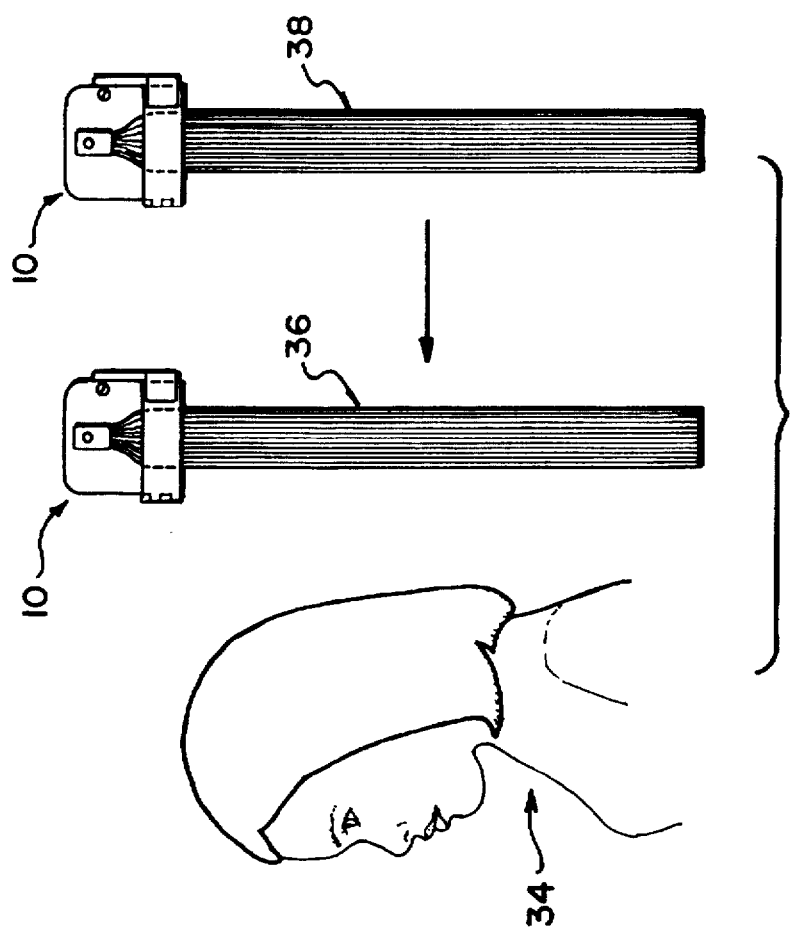
FIG. 8 illustrates a side view of a customer and a first group of colour filament swatches held in a swatch holder and blended to match the base hair colour of the customer, and a second group of colour filament swatches held in a second holder and blended to match the hair colour tint that is to be added to the hair of the customer.

FIG. 8 illustrates a side view of a customer and a first group of coloured filament swatches 36 blended to match the hair colour of the customer 34, and a second group of colour filament swatches 38 blended to match the hair colour tint that is to be added to the hair of the customer 34. Then, the hair colourist combines the red auburn swatch group 38 with the basic coloured filament group 36, which has previously been matched with the hair colour of the customer 34, the two groups of swatches 36 and 38, are then brushed together to achieve a blended effect, and this blended group of filaments is then shown to the customer 34. If the customer 34 likes the effect, then the hair colourist will mix in a cup or container an amount of hair colouring, dye or tint which is proportional to the weight of coloured swatches that make up the group of swatches 38. The hair colourist would also add a typical setting agent such as hydrogen peroxide to the hair colouring. The setting agent and the hair colouring are then mixed, and the combination is applied to the hair of the customer 34. Once the hair colouring process is completed, the hair colour of the customer 34 will match the desired blended effect achieved by combining originally the red auburn group of swatches 38, with the basic group of swatches 36 which match the original hair colour of the customer. By following this procedure, there are no unpleasant surprises because the effect of the red auburn tint on the hair colouring on the original hair colour of the person has already been determined by combining swatch groups 36 and 38, and previously approved by the customer 34.

Figure 9:
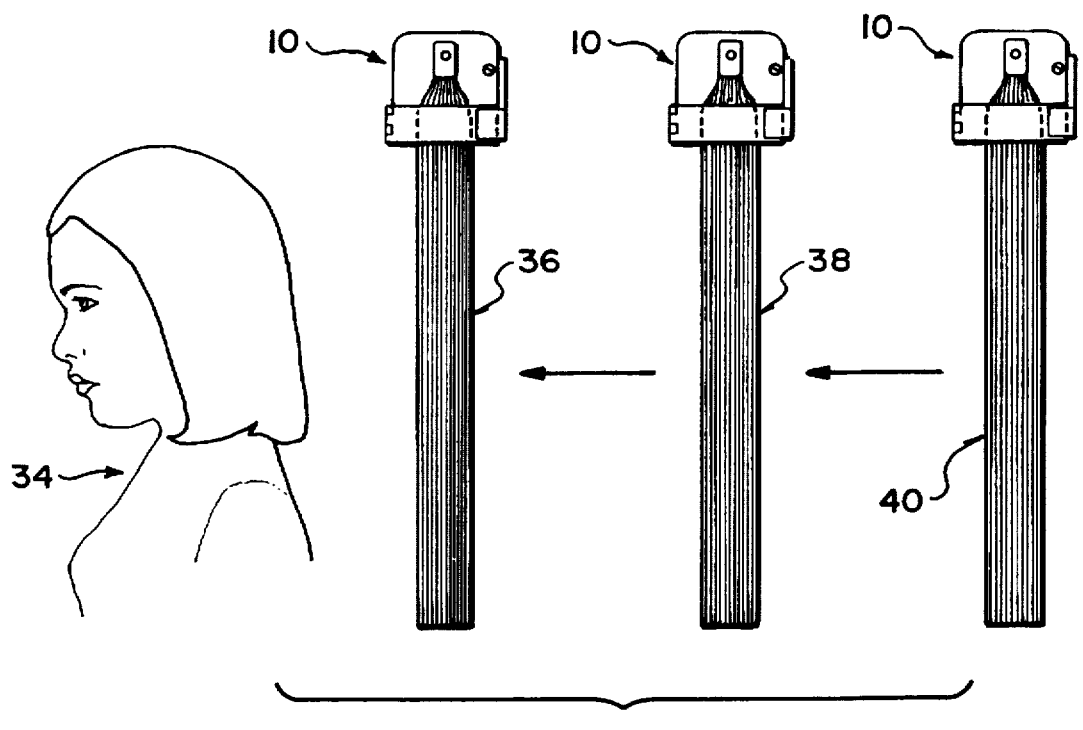
FIG. 9 illustrates a side view of a customer and a first group of colour filament swatches held in a first swatch holder and blended to match the base hair colour of the customer, a second group of colour filament swatches held in a second swatch holder and blended to match one of the hair colour tints that is to be added to the hair of the customer, and a third group of colour filament swatches held in a third swatch holder and blended to match a second hair colour tint that is to be added to the hair colour of the customer.

FIG. 9 illustrates a side view of a customer 34 and a first group of coloured filament swatches 36 blended to match the hair colour of the customer, a second group of colour filament swatches 38 blended to match a first hair colour tint that is to be added to the hair of the customer 34, and a third group of coloured filament swatches 40 matching a second hair colouring tint, the combination of hair colour tints being added to the hair colour of the customer 34.

In certain situations, the customer 34 may want a blended colour or tint to be added to her hair. In most cases, that can be dealt with by using only a second swatch 36. However, in some cases, as seen in FIG. 9, it may be necessary to combine two or more individual colour filament swatches of various colours, or groups of such colour filament swatches, or delete certain swatches, in order to achieve the desired blended effect. For instance, perhaps the customer 34 wishes to add a hair colour to her hair which is more complex than a simple red auburn tint. For instance, perhaps the customer 34 may wish to have a combination of red and blonde tints added to her hair colour. In some cases, that can be dealt with by one set of swatches, subtracting or adding as required. But in certain cases, more complexity is required. As seen in FIG. 9, a second swatch group 40 comprising one or more blonde swatches, and the first filament group 38, comprising red auburn swatches, would be combined with the basic blended colour filament group 36, which matches the basic hair colour of the customer 34, and the mixed group then brushed together in order to illustrate the outcome of mixing the different groups of colour filaments. Both the hair colourist and the customer would be able to view the combination of colour swatches, and the ultimate result, and thereby decide whether or not the effect desired by the customer would be achieved. Variations and adjustments can be made simply by deleting or adding further individual swatches to either group 38 or 40, the combination then being brushed together to achieve a blended effect, and the process repeated until such time as the hair colourist and the customer 18 achieve the required desired blended effect.

As mentioned before, it may be necessary to subtract or take away certain filaments to achieve a desired blended effect. This aspect is part of the invention, as well as adding filaments.

EXAMPLE

The process of the invention has been tested on a number of customers and in particular, for purposes of this example, a young lady in Red Deer, Alberta, Canada. The hair colour of the young lady was basically brunette. First of all, the hair colourist mixed together a group of selected colour filament swatches in order to match the brunette hair colour of the young lady. In her case, in order to match the hair colour of the young lady, three brown filament swatches, one black filament swatch, and one blonde filament swatch, were combined as a group, the filaments brushed together for about one minute in order to achieve a blended effect, and the blended filaments were then placed adjacent the hair of the young lady. It was noted that the blended filaments closely matched the hair colour of the young lady. Both the young lady and the hair colourist were able to view the blended combination and approve the blend.

The young lady wished to add red auburn highlights to her basic brunette hair colour. The hair colourist then selected a red auburn swatch which corresponded to one ounce of red auburn hair colouring. The red auburn swatch was then combined with the other group of swatches comprising one black swatch, three brown swatches and one blonde swatch and clipped together. The whole combination of filaments then were brushed together for about one minute in order to achieve a further blended effect. Once the red auburn swatch was blended in with the other filaments which corresponded with the basic brunette hair colour of the customer, the blended effect had a red auburn tint. The blend of filaments was then shown to the young lady who approved the combination.

The hair colourist then mixed one ounce of red auburn hair colouring, with one ounce of hydrogen peroxide, mixed the two together, and then proceeded to apply the mixture of red auburn hair colouring and hydrogen peroxide to the hair of the young lady using a dabbing brush which was then used to dab individual small groups of hairs of the young lady over the entire head. After all of the hair of the young lady had been treated with the mixture of red hair colouring and hydrogen peroxide, and the hair was then dried, the resulting hair colouring of the young lady, with red auburn highlights, turned out to be precisely the same as the previously approved mixture of colour filament swatches tested and approved by both the hair colourist and the customer. This was proved by holding the group of coloured filament swatches with the red auburn highlights, previously blended together, against the red auburn highlighted hair of the customer. The result was uncanny. The blended mixture of coloured filament swatches corresponded exactly with the red auburn highlighted tint of the young lady who had just received the hair colouring treatment. There were no disappointments. The outcome was precisely as predicted by the blended red auburn highlighted filaments.

Figure 10:
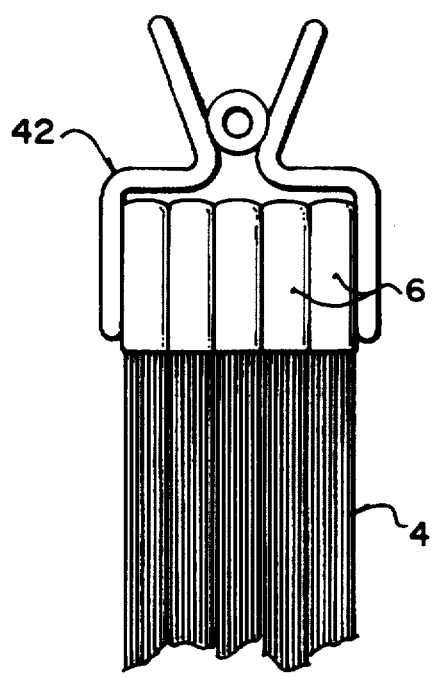
FIG. 10 illustrates a side view of five colour filament swatches held adjacent one another by a clip.

FIG. 10 illustrates a side view of five coloured filament swatches held adjacent one another by a clip. FIG. 10 illustrates an alternative design of apparatus for grouping together an array of colour filament swatches. As seen in FIG. 10, five filament bases 6 are held together in juxtaposition by a hinged, two member scissor-action spring holder 42. The filaments 4 of the five bases 6, can be of the same colour, or of different colours, in order to achieve a consistent or blended colour effect. The blended effect is achieved by brushing together the various groups of colour filaments 4. By brushing the filaments of various colours together, the hair colourist and the customer can see what the blended result will look like.

Figure 11:
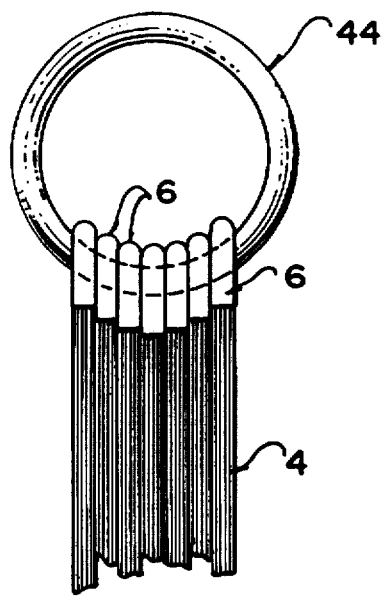
FIG. 11 illustrates a front view of a ring holder which holds a group of clipped-on colour filament swatches adjacent one another.

FIG. 11 illustrates a front view of a ring 44 which holds a group of clipped-on coloured filament swatches adjacent one another. FIG. 11 illustrates another possible alternative way of grouping together a group of filament bases 6 with various colours of filaments 4, with the free ends of the filaments exposed for brushing. The bases 6 are held together in juxtaposition on a swatch ring 44. The bases 6 can be constructed with clips so that they removably fasten onto the ring 44. Again, the required colour effect can be achieved by combing or brushing together the various groups of filaments 4 to achieve a blended colour effect.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of determining the outcome of colouring a person's hair comprising:
   (a) blending together a first group of coloured filaments to match the basic hair colour of the person;
   (b) blending together a second group of coloured filaments corresponding to the degree of colour tint to be added to the basic hair colour of the person; and
   (c) blending together the first group of basic hair colour matching filaments (a) with the second group of colour tint filaments (b) to achieve a blended colour combination for visualization by the person.

2. A method as claimed in claim 1 wherein the number of coloured filaments (b) is proportional to the weight of hair colouring tint to be added to the hair of the person.

3. A method as claimed in claim 2 wherein hair colouring tint and hair colour setting agent proportional to the number of filaments of the colour accented filaments (b) are mixed together, and are applied to the hair of the person.

4. A method as claimed in claim 1 wherein a first group of coloured filaments is blended with a second group of coloured filaments of a second colour to achieve a blended mixed combination of the first and second colours, and the thus blended first and second groups of coloured filaments are then blended together with the group of basic hair colour matching filaments (a).

5. A method as claimed in claim 1 wherein the mixture of coloured filaments are selected from a group of coloured filaments comprising:
   (a) at least one swatch having a group of parallel disposed black filaments;
   (b) at least three swatches having a group of parallel disposed brown filaments;
   (c) at least three swatches having a group of parallel disposed blonde filaments;
   (d) at least three swatches having a group of parallel disposed red auburn filaments;
   (e) at least three swatches having a group of parallel disposed grey filaments;
   (f) at least one swatch having a group of parallel disposed white filaments;
   (g) at least one swatch having a group of parallel disposed brilliant red filaments;
   (h) at least two swatches having a group of parallel disposed violet filaments;
   (i) at least one swatch having a group of parallel disposed gold filaments;
   (j) at least two swatches having a group of parallel disposed blue filaments; and
   (k) at least two swatches having a group of parallel disposed green filaments.

* * * * *